United States Patent
Hager et al.

(10) Patent No.: US 10,659,493 B2
(45) Date of Patent: May 19, 2020

(54) TECHNIQUE FOR DETECTING MALICIOUS ELECTRONIC MESSAGES

(71) Applicant: retarus GmbH, Munich (DE)

(72) Inventors: Martin Hager, Munich (DE); Michael Grauvogl, Munich (DE)

(73) Assignee: retarus GmbH, Munich (DE)

( * ) Notice: Subject to any disclaimer, the term of this patent is extended or adjusted under 35 U.S.C. 154(b) by 170 days.

(21) Appl. No.: 15/389,954

(22) Filed: Dec. 23, 2016

(65) Prior Publication Data
US 2017/0201529 A1    Jul. 13, 2017

(30) Foreign Application Priority Data

Jan. 8, 2016 (EP) ..................... 16150573

(51) Int. Cl.
*H04L 29/06* (2006.01)
*H04L 12/58* (2006.01)
*G06F 21/56* (2013.01)
*G06F 16/28* (2019.01)
*G06F 21/64* (2013.01)

(52) U.S. Cl.
CPC .......... *H04L 63/145* (2013.01); *G06F 16/285* (2019.01); *G06F 21/56* (2013.01); *H04L 51/04* (2013.01); *H04L 63/1416* (2013.01); *G06F 21/564* (2013.01); *G06F 21/64* (2013.01)

(58) Field of Classification Search
CPC ... H04L 63/145; H04L 51/04; H04L 63/1416; G06F 21/56
USPC .......................................................... 726/24
See application file for complete search history.

(56) References Cited

U.S. PATENT DOCUMENTS

| 7,539,871 | B1 | 5/2009 | Osborn | |
|---|---|---|---|---|
| 7,694,150 | B1* | 4/2010 | Kirby | G06F 21/55 713/188 |
| 8,321,936 | B1* | 11/2012 | Green | H04L 63/1416 718/1 |
| 9,398,037 | B1* | 7/2016 | Roskind | G06F 8/65 |
| 2008/0086772 | A1 | 4/2008 | Chesla | |

(Continued)

OTHER PUBLICATIONS

European Search Report for Application No. 16150573, dated Mar. 14, 2016.

*Primary Examiner* — Khalil Naghdali
(74) *Attorney, Agent, or Firm* — Marshall, Gerstein & Borun LLP

(57) ABSTRACT

A method of detecting malicious electronic messages transmitted from at least one message sending device to at least one message receiving device includes: generating at least one signature for an electronic message; storing the generated signature in a data storage unit; determining whether the electronic message is malicious; if the electronic message is determined to be malicious, determining on the basis of the generated signature, whether electronic messages comparable to the determined malicious message were classified as non-malicious and transmitted to the message receiving device in the past; and if it is determined that electronic messages comparable to the determined malicious message were classified as non-malicious and transmitted to the message receiving device in the past, notifying the message receiving device about a potential threat. Also disclosed are a messaging server and a messaging system implementing the above described method.

11 Claims, 5 Drawing Sheets

(56) References Cited

U.S. PATENT DOCUMENTS

| | | | | |
|---|---|---|---|---|
| 2012/0151585 A1* | 6/2012 | Lamastra | ............... | H04L 51/12 |
| | | | | 726/24 |
| 2014/0366137 A1* | 12/2014 | Tatarinov | ............... | G06F 21/56 |
| | | | | 726/24 |
| 2015/0143275 A1* | 5/2015 | Lee | ............... | G06F 3/0482 |
| | | | | 715/771 |
| 2016/0260169 A1* | 9/2016 | Arnold | ............... | G06Q 40/12 |
| 2019/0364061 A1* | 11/2019 | Higbee | ............... | G06F 16/35 |

* cited by examiner

TECHNIQUE FOR DETECTING MALICIOUS ELECTRONIC MESSAGES

TECHNICAL FIELD

The present disclosure relates generally to security aspects in information technology. In particular, the disclosure relates to a technique for detecting malicious electronic messages which are transmitted from at least one message sending device to at least one message receiving device.

BACKGROUND

Electronic messages, such as electronic mail messages (or e-mails), instant messages, faxes and so on, are the method of choice for exchanging information with one another. As the use of electronic messages has become very popular, it is not surprising that electronic messages, such as e-mails, are frequently used for malware proliferation. In this context the term "malware" or "malicious software" refers to any software or software portions used to disrupt computer operations, gather sensitive information, or gain access to private or corporate computer systems. Malware embedded in or attached to electronic messages and distributed via electronic messages can include, among others, viruses, worms, trojan horses, ransomware, scareware, adware and/or other malicious programs.

In order to impede malware proliferation across a communications network, numerous antimalware solutions following different protection or combat strategies are on the market. For instance, there are anti-malware solutions available which are designed to provide real-time protection against installation of malicious software on a computer device by scanning all incoming network data for malware and by immediately blocking any detected threats. Also there are anti-malware solutions available which are designed to detect and remove malicious software that has already been installed on a computer device.

Moreover, in order to efficiently impede malware proliferation in communications networks, appropriate anti-malware solutions are provided for remote messaging servers of the communications networks which are designed to route messages originating from one or more message sending devices to one or more message receiving devices. Such anti-malware solutions on are usually realized in the form of software and hardware modules implemented in the messaging servers which are designed to perform an anti-malware check for each message. That is, the messaging servers scan the messages for malware and only clean messages (i.e., non-malicious messages) are routed to the message receiving devices, whereas malicious messages are filtered out by the messaging servers, even before the malicious message can reach a receiving device.

Such anti-malware solutions usually work on the basis of a comparison of the message content with known virus signatures. A virus signature is an algorithm or a static hash (i.e., a numerical value of a portion of code unique to the virus) that can be used as fingerprint for a specific virus. Such an anti-malware detection technique is very efficient, but has the shortcoming that only viruses already known by the anti-malware software can be efficiently filtered out. Even in case the known virus signatures of the anti-malware module are regularly updated, there is some risk that newest generation malware (so called "zero-day malware") may remain undetected. Hence, the known anti-malware detection for communications systems or communications networks has the risk that newest generation malware remains undetected for a longer period of time. Accordingly, malicious messages which are erroneously considered to be clean may be routed to message receiving devices rather than filtered out.

Accordingly, there is a need for an efficient malware detection technique in communications networks which overcomes the above-mentioned technical disadvantages.

SUMMARY

To overcome the above-identified technical problem, according to a first aspect there is provided a method of detecting malicious electronic messages transmitted from at least one message sending device to at least one message receiving device. The method comprises the steps of generating at least one signature for an electronic message to be transmitted from the at least one message sending device to the at least one message receiving device; storing the generated at least one signature in a data storage unit; determining whether the electronic message is malicious; if the electronic message is determined to be malicious, determining on the basis of the generated at least one signature, whether electronic messages comparable to the determined malicious message were classified as non-malicious and transmitted to the at least one message receiving device in the past; and if it is determined that electronic messages comparable to the determined malicious message were classified as non-malicious and transmitted to the at least one message receiving device in the past, notifying the at least one message receiving device about a potential threat.

In the present disclosure the term "electronic message" (or abbreviated "message"), may have to be construed broadly. As "electronic message", or "message", any digital data item or any digital data portion may be meant which contains a message in the form of symbols, alphabetic and/or numerical characters, graphical elements, and so one, and which can be used in order to embed or attach malware. For instance, as "electronic message", or "message" an electronic mail message, an instant message or any other type of electronic message may be meant.

The method may be carried out on a messaging server. The messaging server may be arranged in a communications network across which messages can be transmitted from the at least one message sending device to the at least one message receiving device. The messaging server may be designed to route messages from the at least one message sending device to the at least one message receiving device for which the messages are intended. For this purpose, the messaging server may be in (continuous) communication with the at least one message sending device and the at least one message receiving device. The server may be implemented as a single computer device or as a computer system comprising distributed computer devices which are configured to carry out the above-described method.

The at least one message sending device may be any device configured to send electronic messages, such as a smartphone, tablet, personal computer, and/or any other private or corporate computer device. In a similar way, the at least one message receiving device may be any device configured to send electronic messages, such as a smartphone, tablet, personal computer, and/or any other private or corporate computer device.

The steps of generating at least one signature, storing the at least one signature in the data storage unit, and determining whether the message is malicious may be repeated for each new message (i.e., for each currently received message in a continuous message flow) to be transmitted to the at least one message receiving device. That is, the messaging server may repeat for each message currently received from the at least one message sending device, the signature generation and storing steps as well as the anti-malware determining step. Thus, over time a large number of signatures can be collected, wherein each signature can be associated with a specific message which have been received and distributed. Accordingly, the data storage unit may comprise a large number of message signatures which can be associated with messages received and distributed to the at least one message receiving device in the past.

Moreover, the above mentioned step of determining whether messages comparable to the determined malicious message were classified as non-malicious and transmitted to the at least one message receiving device in the past (i.e., step d in claim 1) as well as the step of notifying the at least one message receiving device about a potential threat (i.e., step e in claim 1) may be repeated for those newly received messages, for which a specific malicious behaviour or malicious content has been identified for the first time. For newly received clean messages (i.e., messages for which no malicious behaviour or malicious content has been determined) these steps may be omitted.

The step of determining whether messages comparable to the determined malicious message were classified as non-malicious and transmitted to the at least one message receiving device in the past (i.e., step d in claim 1) may further comprise at least one of the following substeps: comparing the at least one signature of the determined malicious message against the signatures already stored in the data storage unit which can be associated with previously transmitted messages; and selecting those signatures of previously transmitted messages from the data storage unit, which has been found to be comparable to the at least one signature of the determined malicious message. Signatures stored in the data storage unit may be regarded as comparable to the at least one signature of the determined malicious message, if the signatures are identical or highly similar to each other. Whether two signatures are highly similar can be determined by estimating whether a degree of similarity between the two signatures exceeds a predetermined threshold value.

The step of generating at least one signature may further comprise generating a message identifier (ID) for each electronic message to be transmitted to the at least one receiving device. Further, the step of storing the generated at least one signature in a data storage unit may further comprise storing, for each message to be transmitted, the generated message ID together with the generated at least one signature in the data storage unit. By associating the generated signatures with corresponding IDs, each signature in the data storage unit can be associated with a specific message transmitted to a specific message receiving device later on.

According to one implementation the step of generating at least one signature can further comprise generating, for each message to be transmitted, specific message information suitable for classifying the transmitted message later on. The generated specific message information may be stored together with the generated at least one signature (and the generated ID) in the data storage unit. The generated specific message information may comprise at least one of the following information: transmission time of the message, message sender information, message destination information, and information about message attachments. Accordingly, the generated specific message information may be used to identify when a specific message has been transmitted, from which message sending device the specific message has been received and/or to which message receiving device the specific message has been sent.

For each message to be transmitted the at least one signature may be generated on the basis of at least one of the following information: at least one message attachment property; and a URL information of the transmitting message sending device. As message attachment property at least one of a name of the attachment, file type of the attachment (e.g., is the attachment a text file, music file, image file and so on), and file extension information (e.g., is the file an executable file) can be used. The attachment properties may be provided as a hash value. The URL information may comprise a complete URL or a portion of the URL which can be associated with a specific message sending device.

The step of determining whether the electronic message is malicious may comprise comparing the electronic message with known virus signatures; and classifying the electronic message as malicious, if the message sufficiently matches one of the known virus signatures. For comparison a Black List (BL) containing known virus signatures may be used. The BL with known virus signatures may be provided and regularly updated by an anti-virus software vendor. In addition or alternatively, heuristic methods can be used in order to detect malicious electronic messages.

According to one implementation the step of notifying the at least one message receiving device may comprise providing information to the at least one message receiving device which indicates that a specific message transmitted in the past be malicious (i.e., may comprise a threat).

The method may further comprise the steps of transmitting the message to the (addressed) at least one message receiving device, if the message has been classified as non-malicious; and blocking the message, if the message has been classified as malicious.

According to another aspect, a computer program product with program code portions is provided for carrying out the above described method when the computer program product is executed on a computer device (e.g. a messaging server). The computer program product may be stored on a (non-transitory) computer-readable recording medium.

According to another aspect a messaging server is provided, wherein the messaging server is configured to transmit electronic messages received from at least one message sending device to at least one message receiving device. The messaging server is further configured to detect malicious electronic messages and comprises the following components: a generating unit configured to generate at least one signature for an electronic message to be transmitted from the at least one message sending device to the at least one message receiving device; a data storage unit configured to store the generated at least one signature; an antivirus unit configured to determine whether the electronic message is malicious or not; a determining unit configured to determine, in the case of a determined malicious message, whether electronic messages comparable to the determined malicious message were classified as non-malicious and transmitted to the at least one message receiving device in the past; and a signalling unit configured to signal a potential threat to the at least one message receiving device, if it is determined that electronic messages comparable to the determined malicious message were classified as non-malicious and transmitted to the at least one message receiving device in the past.

The messaging server may be implemented in the form of a single computer device or in the form of distributed computer devices which are arranged in a network remote from the at least one message sending device and the at least one message receiving device. The messaging server may be in (continuous) communication with the at least one message sending device and the at least one message receiving device in order to receive messages from the at least one message sending device and to transmit the received messages to the at least one message receiving device.

According to still another aspect, a messaging system is provided, which comprises the above described messaging server, at least one message sending device, and at least one message receiving device. The messaging server is in communication with the at least one message sending device and the at least one message receiving device.

BRIEF DESCRIPTION OF THE DRAWINGS

Further details, aspects and advantages of the present disclosure described herein will become apparent from the following drawings, in which.

DETAILED DESCRIPTION

In the following description, for purposes of explanation and not limitation, specific details are set forth in order to provide for a thorough understanding of the technique presented here-in. It will be apparent to one skilled in the art that the disclosed technique may be practised in other embodiments that depart from these specific details.

Figure 1:
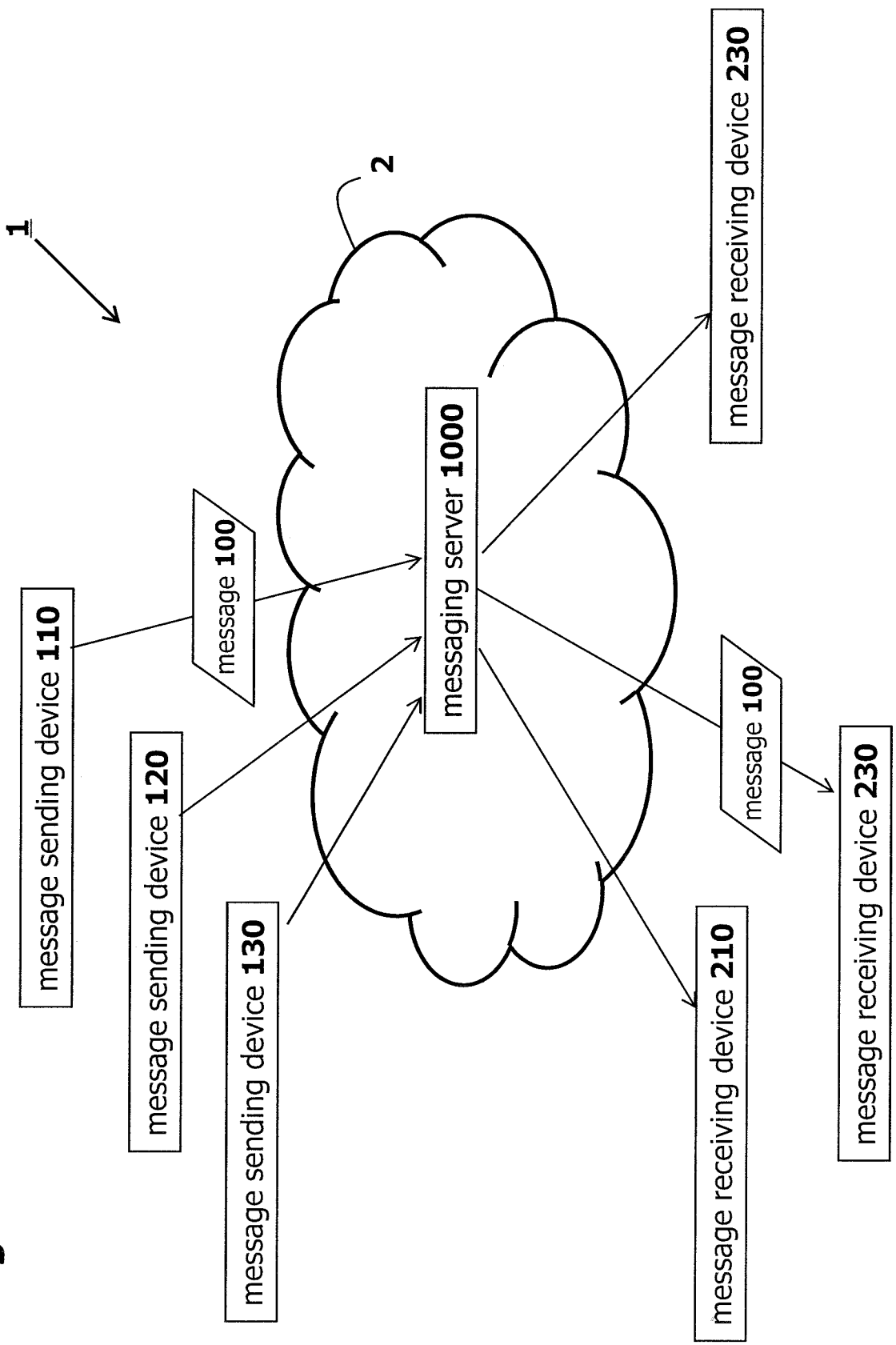
FIG. 1 is a block diagram illustrating a messaging system configured to detect malicious electronic messages according to an exemplary embodiment of the present invention.

FIG. 1 illustrates, in the form of a block diagram, an exemplary embodiment of a messaging system 1 which can implement the below described technique for detecting malicious electronic messages.

The messaging system 1 comprises at least one messaging server 1000, one or more message sending devices 110, 120, 130, and one or more message receiving devices 210, 220, 230. The one or more message sending devices 110, 120, 130 and the one or more message receiving devices 210, 220, 230 may each be implemented in the form of portable user terminals (such as PDAs, cell phones, smartphones, notebooks) or fixed computer devices. The messaging server 1000 may be realized in the form of a single computer device or in the form of two or more computer devices distributed over a network 2. The invention does not depend on the above described hardware implementation details of the messaging server 1000, the message sending devices 110, 120, 130 and the message receiving devices 210, 220, 230.

As illustrated in FIG. 1, the messaging server 1000 is arranged remote from the corresponding message sending devices 110, 120, 130 and message receiving devices 210, 220, 230. The messaging server 1000 is configured to route messages 100 received from the one or more message sending devices 110, 120, 130 to one or more specific message receiving devices 210, for which the messages are intended. For this purpose, the messaging server 1000 is arranged to be in (continuous) communication with each of the message sending devices 110, 120, 130 and each of the message receiving devices 210, 220, 230. The communication between the messaging server 1000 on the one hand and the corresponding message sending devices 110, 120, 130 and message receiving devices 210, 220, 230 on the other hand can be established via corresponding wireless and/or wired communication channels. Moreover, any known communication standard can be used in order to communicate one or more messages 100 between the message sending devices 110, 120, 130 and the message receiving devices 210, 220, 230. For instance, the TCP/IP protocol can be used for message communication.

The messaging server 1000 is designed to receive one or more messages 100 from communicating message sending devices 110, 120, 130, and to route the received messages 100 to corresponding message receiving devices 210, 220, 230, for which the received messages 100 are destined. According to the exemplary illustration in FIG. 1 the messaging server 1000 is designed to route a message 100 received from the message sending device 110 to the destined message receiving device 230.

The server 1000 is further configured to perform an anti-malware check (e.g., an antivirus scan) for each received message 100 before the message 100 is routed to the corresponding message receiving devices 210, 220, 230. The server 1000 will block all those messages 100 which are identified as malicious messages (i.e., which comprise malicious content), whereas messages 100 which are identified as non-malicious (i.e., clean messages) are directly routed to the corresponding message receiving devices 210, 220, 230.

Figure 2:
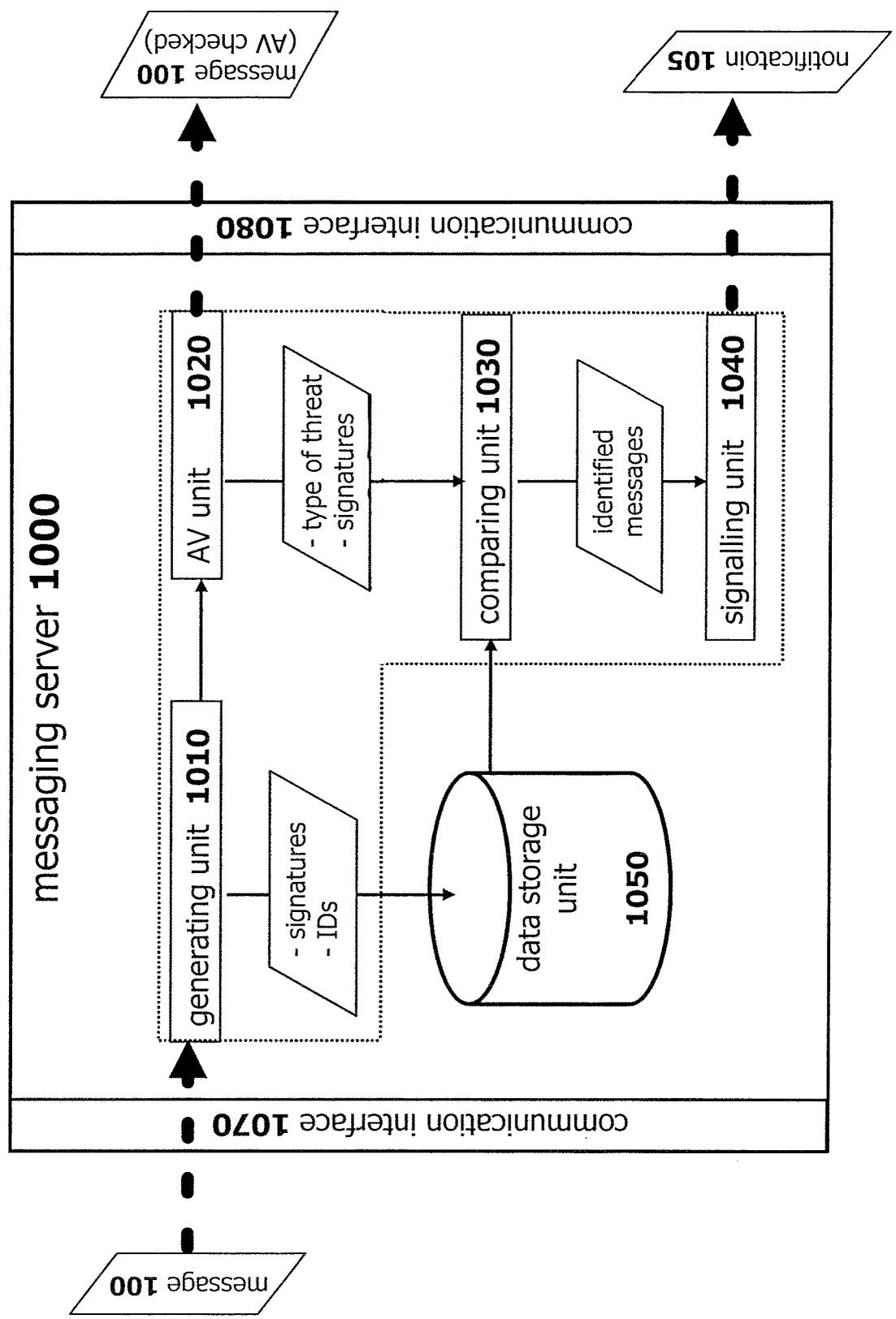
FIG. 2 is a block diagram illustrating a messaging server configured to detect malicious electronic messages according to an exemplary embodiment of the present invention.

With reference to FIG. 2, the structure and functionality of the messaging server 1000 is further described.

The server 1000 comprises a generation unit 1010, an antivirus unit 1020 (in FIG. 2 referred to as AV unit), a comparing unit 1030, a signalling unit 1040 and a data storage unit 1050. Further, the server 1000 comprises a first communication interface 1070 and a second communication interface 1080. The units 1010, 1020, 1030, 1040, 1050 as well as the interfaces 1070, 1080 are in communication with each other.

Each of the generating unit 1010, comparing unit 1030, signalling unit 1040 and the AV unit 1020 can be implemented as a separate software module, hardware module or a combined software/hardware module. Alternatively, the generating unit 1010, comparing unit 1030, signalling unit 1040 and the AV unit 1020 can also be implemented as sub-modules of a commonly designed software and/or hardware module as illustrated by the dotted box in FIG. 1. One skilled in the art will appreciate that the above mentioned units 1010, 1020, 1030, 1040 may be implemented using software functioning in conjunction with a programmed microprocessor, using an Application Specific Integrated Circuit (ASIC), a Digital Signal Processor (DSP) or general purpose computer.

Regardless of the above mentioned implementation details, the generating unit 1010 is in communication with the input unit 1070 and is configured to generate, on the basis of received messages 100 from the input unit 1070, at least one signature for each electronic message 100. According to one implementation, the generating unit 1010 is also configured to generate a message identifier (ID) for each message 100 for which the at least one signature is generated.

The data storage unit 1050 is configured to store for each message 100 the at least one signature and associated message ID generated and handed over by the generating unit 1010.

The AV unit 1020 is configured to provide an anti-virus analysis (AV analysis) for each electronic message 100 received via the input unit 1070. The AV analysis involves a comparing analysis performed on the basis of an updatable Black List (BL) provided by an anti-virus software vendor. The BL comprises a complete list of malware signatures of all known malware against which the message content (including the message attachments) is compared. Moreover, since the BL is updatable, the BL can be regularly supplemented by the newest malware signatures. It is noted that the present invention does not depend on the specific AV analysis technique. It is also conceivable that the AV unit 1020 uses heuristic techniques and/or emulation techniques in addition to the above mentioned BL comparison. Still further it is also conceivable that an external AV analysis system or external AV service is used instead of or additional to the AV unit 1020 in order to perform one or more AV checks for the received messages 100.

The AV unit 1020 is further configured to filter out and block those messages 100 which are found to comprise malicious content. Such messages are classified by the AV unit 1020 as malicious messages. Therefore, the AV unit 1020 allows a transmission of only those messages 100 to the message receiving devices 210, 220, 230, which are found to be clean.

The comparing unit 1030 is configured to compare the generated signatures of currently or recently received malicious messages 100 revealing new types of threats (i.e. signatures generated by the generating unit 1010 for messages comprising zero-day malware) with signatures of previously received messages 100, which are stored in the data storage unit 1050. The comparing unit 1030 is further configured to select those signatures associated with previously transmitted messages 100 from the data storage unit 1050, which are found to be comparable with the generated signatures of the currently or recently received malicious messages 100. Still further, the comparing unit 1030 is configured to identify, on the basis of the selected signatures and the associated message IDs, the corresponding messages which have been transmitted in the past and which have been considered to be clean messages (i.e., non-malicious messages).

The signalling unit 1040 is configured to generate, on the basis of the identified messages, at least one notification 105 indicating that specific messages transmitted in the past may be malicious. The notification(s) 105 may comprise a list of those messages which have been considered as clean messages in the past, but which have found to reveal signatures comparable to the signature(s) of the current message, which has been classified as malicious for the first time.

The first communication interface 1070 is configured to receive electronic messages 100 from the corresponding message sending devices 110, 120, 130 and to provide the received electronic messages 100 to the comparing unit 1010 and AV unit 1020. Further, the second communication interface 1080 is configured to transmit those messages 100, which are determined to be clean by the AV unit 1020 (and therefore not blocked by the AV unit 1020), to the message receiving devices 210, 220, 230. Moreover, the second communication interface 1080 may also be configured to transmit the generated notification(s) 105 to the respective message receiving devices 210, 220, 230. Both communication interfaces 1070, 1080 can be implemented in the form of a wireless communication interface (for instance, radio transmission interface) and/or a wired communication interface, depending on how the communication between the respective message sending devices 110, 120, 130 and the message receiving devices 210, 220, 230 is implemented.

Figure 3A:
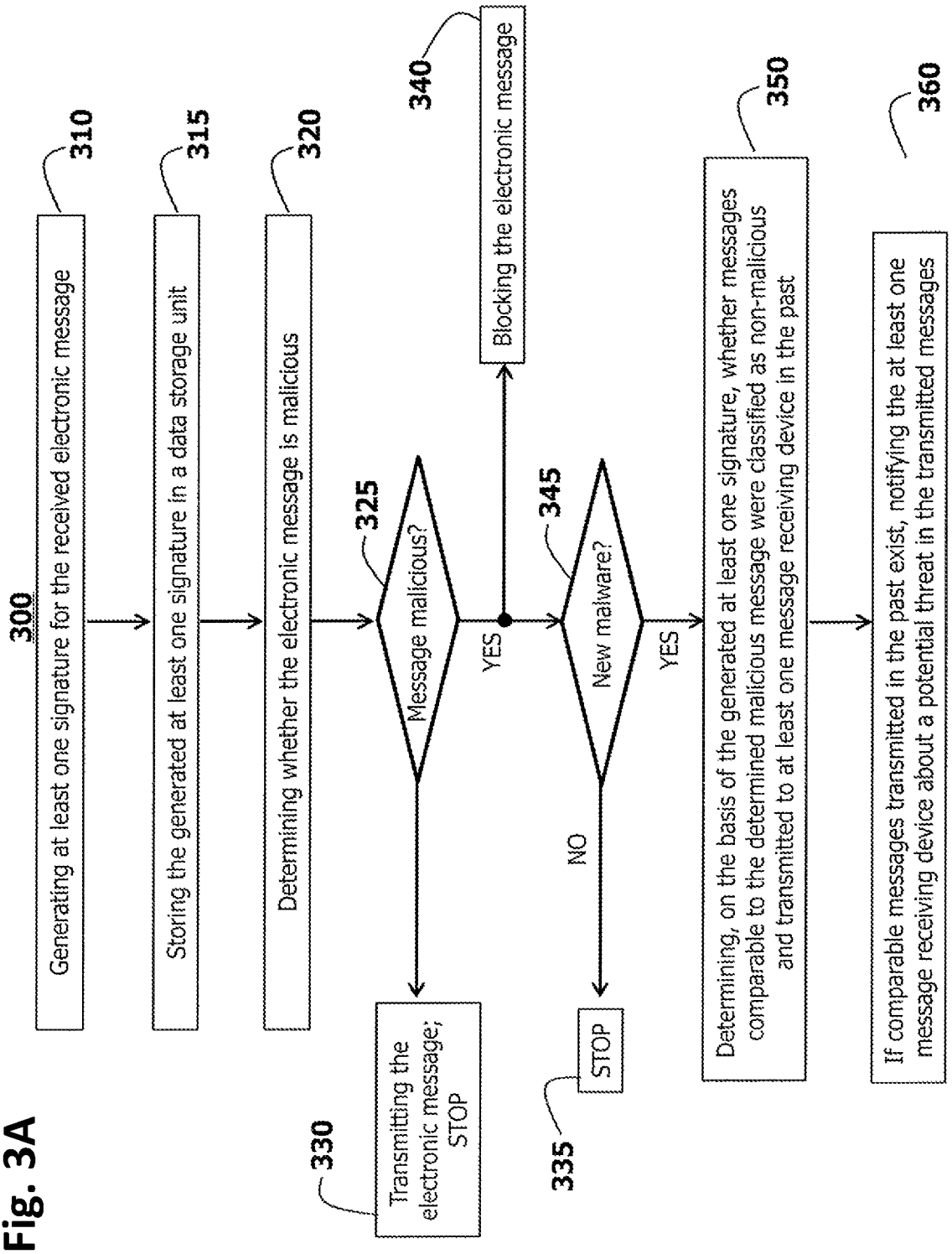
FIGS. 3A and 3B are flow diagrams illustrating a method of detecting malicious electronic messages according to an exemplary embodiment of the present invention.
Figure 3B:
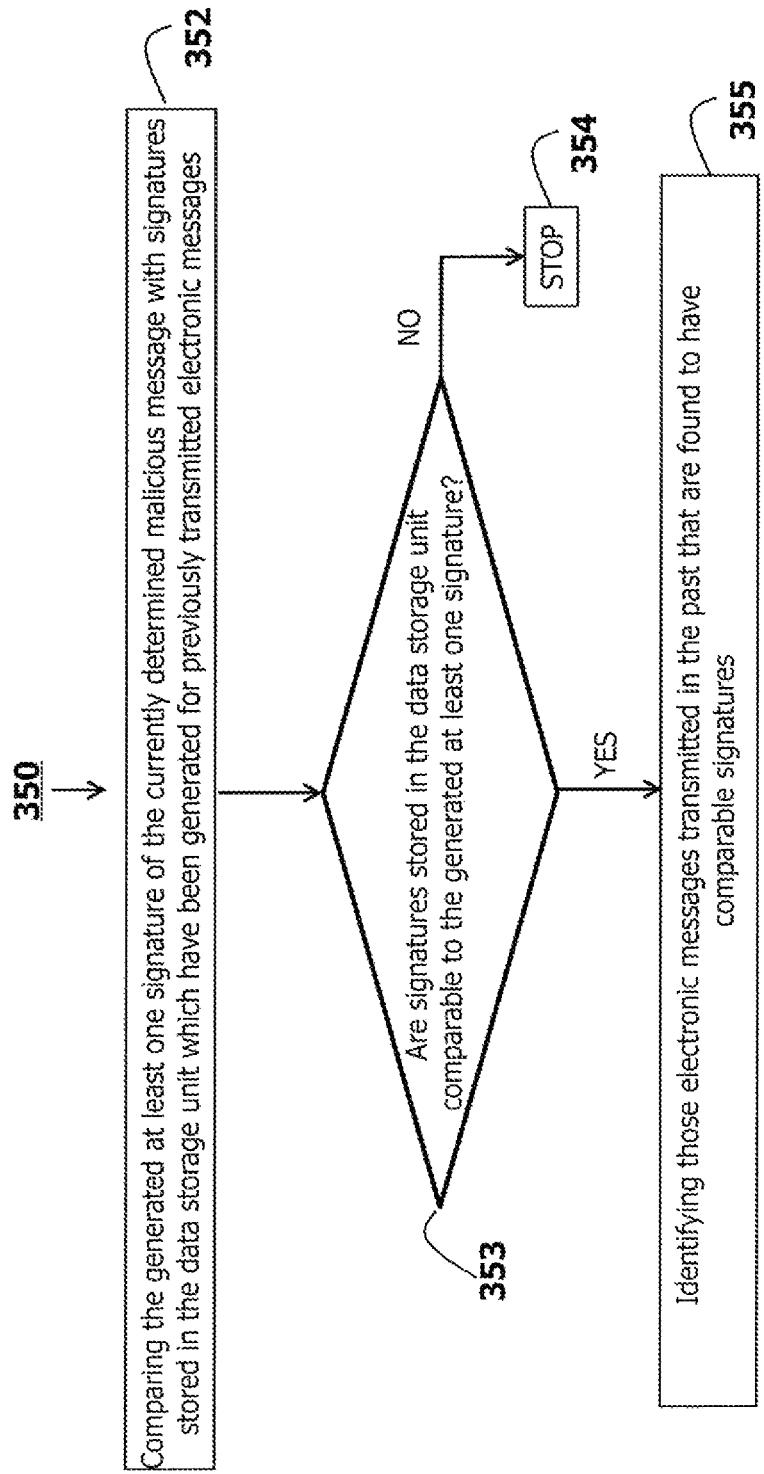

The functionalities of the units 1010, 1020, 1030, 1040 shown in FIG. 2 are further explained in conjunction with the two flow diagrams 300, 350 in FIGS. 3A and 3B. The flow diagrams 300, 350 illustrate a method of detecting malicious electronic messages 100 transmitted from the one or more message sending devices 110, 120, 130 to the one or more message receiving devices 210, 220, 230. The method is performed in the messaging server 1000 as already explained above in conjunction with FIG. 2 and comprises for each message 100 received from at least one of the at least one message sending devices 210, 220, 230 the following steps.

The method starts with step 310 in FIG. 3A, according to which for each received message 100 at least one signature indicative of message properties is generated by the generation module 110. The generated at least one signature can map message properties such as message attachment properties (for instance, at least one of a name, file type, and file extension of a message attachment), a URL information associated with the message receiving device, from which the message stems. It is noted that the message signatures are generated by the generating unit 1010 in real-time for each incoming message 100. Moreover the generated message signatures may be different from the malware signatures used by the AV unit 1020 and provided by an anti-virus software vendor. Further, for each received message 100 a message ID is generated and allocated to the generated at least one signature so that the signatures can be associated with the message 100 later on.

Moreover, according to one implementation specific message information suitable for classifying and identifying the transmitted messages can additionally be generated for each message 100. Such information may comprise at least one of a message time, a message sender information, message destination information and message attachment information available to the messaging server 1000 at the time the message is received from the at least one message sending device 110, 120, 130. The message time may indicate a time instant at which the message 100 was received from a message sending device 110, 120, 130 or transmitted to a message receiving device 210, 220, 230. The sender information may comprise a name, IP address or other information for identifying the message sending device 110, 120, 130 from which the message 100 has been received. In a similar way, the destination information may comprise a name, IP address or other information for identifying the message receiving device 210, 220, 230 to which the message 100 has been sent. The message attachment information may, for instance, comprise at least an attachment name or similar information for identifying the attachment.

In a subsequent step 315, for each received message 100 the generated at least one signature (and, optional, specific message information) are stored together with the generated ID in the data storage unit 1050. Hence, within a continuous message flow from the at least one message sending device 110, 120, 130 to the at least one message receiving device 210, 220, 230, message signatures (and, optional, specific message information) are recorded for each message 100 and made available for analysing in retrospect whether messages 100 transmitted in the past contained malware or not.

In a subsequent step 320, each received message 100 is provided to the AV unit 1020. The AV unit 1020 immediately performs an AV analysis in order to determine whether the received message 100 is malicious or not. For the purpose of determining whether the received message 100 is malicious or not, the AV unit 1020 can apply an AV detection technique as described in conjunction with FIG. 2 above.

If it is determined, by the AV unit 1020, that the received message 100 is not malicious (cf. decision step 325 and "NO" branch in FIG. 3A), the message 100 is transmitted to the corresponding message receiving devices 210, 220, 230 (step 330 in FIG. 3A). In such a case the method terminates for the considered message 100 and restarts with a newly received message 100 (i.e., the next received message 100 in the message flow).

If, however, it is determined, by the AV unit 1020, that the received message 100 is malicious (see "YES" branch in FIG. 3A), the message 100 to be transmitted to the at least one message receiving device 210, 220, 230 is blocked. Optionally, a notification can be transmitted to the destined message receiving device 302, 304, 306 indicating that the message 100 has been blocked because the message 100 has been classified as malicious message (not shown in FIG. 3A).

In addition, if it is determined, by the AV unit 1020, that the received message 100 is malicious (see "YES" branch in FIG. 3A), it is further checked in the subsequent method step 345 whether the malicious message 100 comprises new malware (i.e. a new threat) which has not been detected by the AV unit 1020 so far. More specifically, it is checked whether the determined malware constitutes a zero-day malware which could only be detected by the AV unit 1020 taking into account the latest malware signature updates made available by an anti-virus provider. If it is found that the determined malware or threat has been already detected in the past, the malware is regarded as not new and the algorithm is stopped for the currently considered message (see "NO" branch in FIG. 3A). If it is found that the malware is detected for the first time by the AV module 1020, the malware is regarded as a zero-day malware and the method continues with steps 350 and 360 (see "YES" branch in FIG. 3A.)

In step 350 it is determined, on the basis of the generated at least one signature, whether messages 100 comparable to the determined malicious message 100 were classified as non-malicious and transmitted to at least one message receiving device 210, 220, 230 in the past. The determining step 350 is performed by the comparing unit 1030 and comprises the following sub-steps illustrated in the flow diagram of FIG. 3B. In sub-step 352 the generated at least one signature of the determined malicious message 100 is compared with signatures of the data storage unit 1050 which have been generated and stored in the data storage unit 1050 for previously transmitted electronic messages 100. The comparison is performed on the basis of a similarity check. That is, signatures compared to one another are regarded as comparable if the signatures are found to be identical or highly similar. It is noted that compared signatures are regarded as identical if their signature information corresponds to 100%. Signatures to be compared with each other are regarded as highly similar if the correspondence between the respective signature information exceeds a predetermined threshold value. Preferably a signature information correspondence of 80% or higher is required in order to consider the signatures as highly similar. More preferably a signature information correspondence of 90% or higher, is required in order to consider the signatures as highly similar.

If none of the signatures stored in the storage unit 1050 is found to be comparable (i.e., identical or highly similar) to the generated at least one signature (see decision step 353, "NO" branch), the algorithm stops (step 354) for the currently received message 100 and restarts at step 310 for a newly received message 100. If, however, some of the signatures stored in the storage unit 1050 are found to be comparable to the generated at least one signature (decision step 353, "YES" branch), the method continues with sub-step 355 by identifying those electronic messages transmitted in the past that are found to have comparable signatures. The message identification is performed on the basis of the message IDs (and the additional message information) stored in the storage unit 1050 in conjunction with each stored signature.

Based on the identified messages, the signalling unit 1040 notifies in a subsequent step 360 (cf. again FIG. 3A) the at least one message receiving device 210, 220, 230 about potential threat(s) in the transmitted message(s) 100. According to one implementation the notifying comprises generating and communicating a notification 105 to the at least one message receiving device 210, 220, 230, wherein the generated notification 105 comprises a list of the identified messages, and optionally, the type of threat identified for each message. Hence, by receiving the notification 105 the at least one message sending device 210, 220 230 can be warned about a new malware infiltrated on the message sending device 210, 220, 230. Based on this information the user of the message sending device 210, 220, 230 can take adequate security actions in order to limit potential damages caused by the infiltrated malware. Additionally or alternatively, the notification 105 may cause the message receiving device 210, 230 to perform an automated security actions. That is, the notification 105 from the message receiving device 230 may trigger an automated security action at the message receiving device 210, 230 in order to limit potential damages caused by a malicious message 100. Such security actions may comprise at least one of the following actions: flagging the message 100, moving the message in a specific directory, quarantining the message, subjecting the message to a further user-side AV analysis, and deleting the message 100. The message receiving device 210, 230 may automatically select at least one of the above mentioned security action depending on the identified type of threat of the message.

As not all identified messages 100 may be transmitted to each of the message receiving devices 210, 220, 230, the message list may be generated for each specific message receiving device 210, 220, 230 individually comprising only those identified messages which have been transmitted to the specific message receiving device 210, 220, 230. That is, for each specific message receiving 210, 220, 230 device a specific list containing only the messages transmitted to the specific message receiving devices 210, 220, 230 is generated.

It is noted that for each received message 100, the method terminates with step 356 and restarts at step 310 for a subsequent new message.

Figure 4:
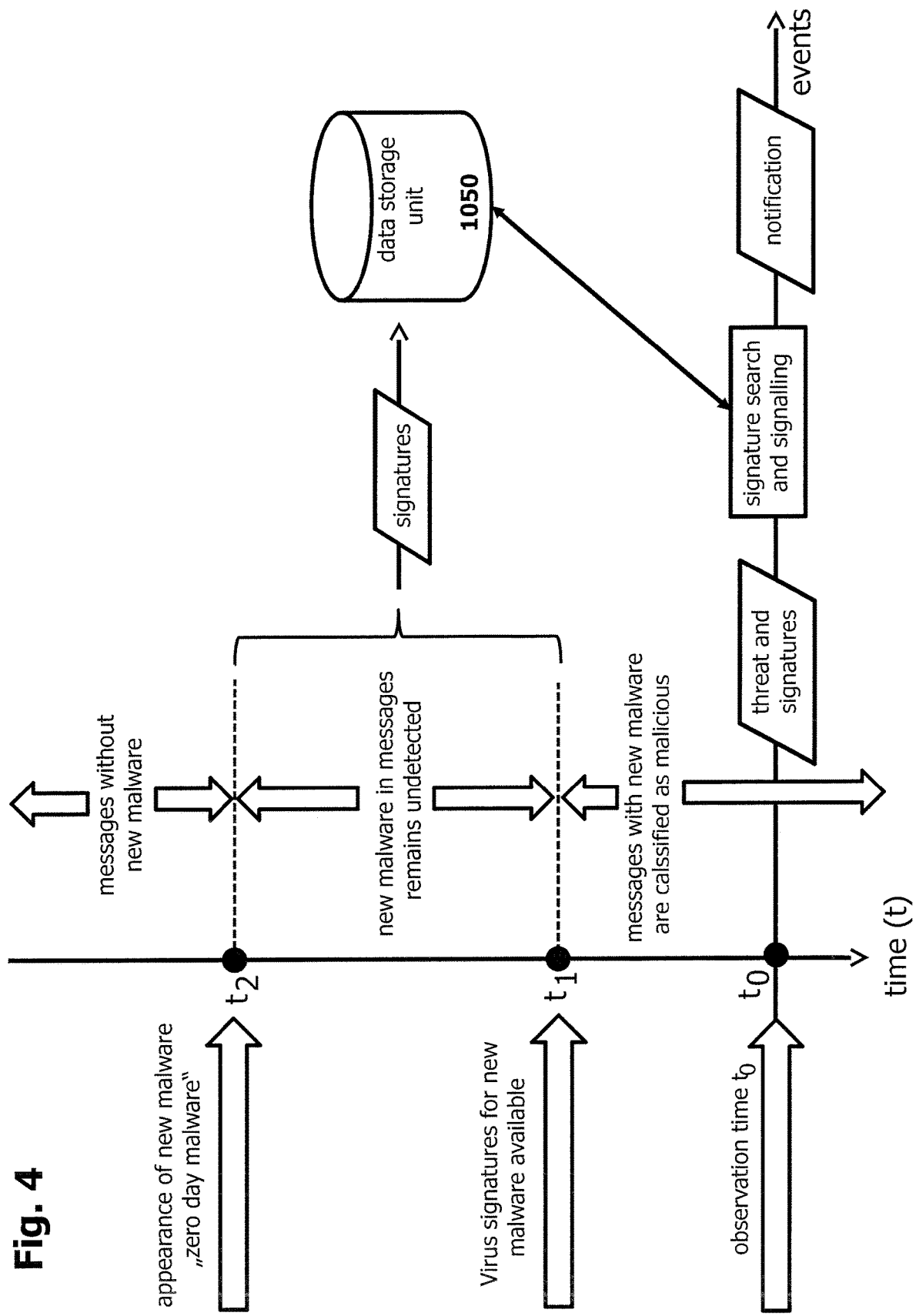
FIG. 4 is a further schematic representation of the method of FIG. 3.

The benefit of the above described malware detection technique is further discussed in conjunction with FIG. 4. FIG. 4 illustrates a diagram comprising a vertically running time line and a horizontally running event line. The time line comprises different points in time t0, t1, and t2, wherein t0 represents a current point in time, which in FIG. 4 is also referred to as "observation time". The points in time t1 and t2 represent earlier points in time. That is, t2 represents a point in time, at which a new malware or threat can appear in a message 100, but remains undetected by the AV unit 1020 because the AV unit 1020 is not sensitive to the new malware yet. Further, t1 represents a point in time between t0 and t2, at which new virus signatures are made available for the AV unit 1020 in order to detect and filter out messages comprising the new malware.

Thus, as illustrated by the vertical arrows in FIG. 3B, only for points in time later than t1 the new malware can be detected and messages comprising the new malware can be filtered out. Moreover, there exists a time gap from t1 to t2 in which the new malware already exists, but cannot be detected yet due to lack of appropriate malware signatures for the AV unit 1020. In conventional messaging servers not implementing the disclosed detection technique this time gap cannot be closed and new malware can be spread in an unobstructed way over a plurality of messaging devices. Moreover, since users of the messaging devices usually rely on the malware filtering capabilities of the messaging server, it is likely that the new malware remains undetected for long periods of time on the message receiving devices.

The disclosed malware detection technique closes this time gap by collecting and storing signatures for all transmitted messages, that is, also for messages sent between t1 and t2. The collected signatures are compared with signatures of malicious messages comprising the new malware (i.e., zero-day malware messages) detected at time instances later than t1. If messages transmitted between t1 and t2 exist having signatures comparable to the signatures of the detected zero-day malware messages, notifications are generated and transmitted to the corresponding message receiving devices indicating that zero-day malware messages have been transmitted in the past. Hence, with the claimed malware detection technique users of message receiving devices can be warned at an early stage against zero-day malware messages so that the users can take appropriate countermeasures. Further, since the present malware detection technique generates and compares its own signatures which may be different from malware signatures provided by anti-virus software vendors, the present technique is independent from specific AV detection techniques. Rather, the claimed malware detection technique is compatible with any conventional AV detection techniques. Thus, the claimed malware detection technique can be easily implemented in already existing messaging servers.

While the technique presented herein has been described with respect to particular embodiments, those skilled in the art will recognize that the present invention is not limited to the specific embodiments described and illustrated herein. It is to be understood that the disclosure is only illustrative. Accordingly, it is intended that the present invention be limited only by the scope of the claims appended hereto.

The invention claimed is:

1. A method of detecting malicious electronic messages transmitted from at least one message sending device to at least one message receiving device, the method being performed by a messaging server and comprising the steps of:
   a) generating, by the messaging server, at least one signature for a new electronic message to be transmitted from the at least one message sending device to the at least one message receiving device, the generated at least one signature being associated with a message identifier (ID) generated by the messaging server, the message ID being indicative of the electronic message to be transmitted to the at least one message receiving device;
   b) storing, by the messaging server, the generated at least one signature along with the generated message ID in a data storage;
   c) determining, by the messaging server, whether the electronic message is malicious;
   d) if the electronic message is determined to be malicious, determining, by the messaging server, on the basis of the at least one signature generated for the determined malicious message, whether electronic messages comparable to the determined malicious message were classified as non-malicious and transmitted to the at least one message receiving device in the past, wherein the determining step comprises comparing the at least one signature of the determined malicious message with signatures stored in the data storage which are associated with previously transmitted electronic messages; and
   e) identifying, on the basis of the stored signatures and associated IDs, those electronic messages that are found to have signatures comparable with the at least one signature of the determined malicious message and that were classified as non-malicious and transmitted to the at least one message receiving device in the past, and notifying, by the messaging server, the at least one message receiving device about a potential threat, wherein the notifying comprises providing information to the at least one message receiving device which indicates that a specific message transmitted in the past is malicious, wherein at least the steps (a) to (c) are repeated for each new message to be transmitted from the at least one message sending device to the at least one message receiving device.

2. The method according to claim 1, wherein step (a) further comprises: generating, for the electronic message to be transmitted, specific message information suitable for classifying the transmitted message later on.

3. The method according to claim 2, wherein step (b) further comprises: storing the generated specific message information together with the generated at least one signature in the data storage.

4. The method according to claim 2, wherein the specific message information comprises at least one of the following information:
   transmission time of the message;
   message sender information;
   message destination information; and
   information about message attachments.

5. The method according to claim 1, wherein the signature is generated on the basis of at least one of the following elements:
   at least on message attachment property; and
   URL information associated with the message sending device which the message stems from.

6. The method according to claim 1, wherein step (c) further comprises:
   comparing the electronic message with known virus signatures; and
   classifying the electronic message as malicious, if the message sufficiently matches one of the known virus signatures.

7. The method according to claim 1, further comprising at least one of the following steps:
   transmitting the electronic message to the at least one message receiving device, if the message has been classified as non-malicious; and
   blocking the electronic message, if the message has been classified as malicious.

8. A computer program product stored on a non-transitory computer-readable recording medium, the computer program product comprising program code portions that, when executed on a computer device, cause the computing device to perform operations for detecting malicious electronic messages transmitted from at least one message sending device to at least one message receiving device, the operations comprising:
   a) generating, by the messaging server, at least one signature for a new electronic message to be transmitted from the at least one message sending device to the at least one message receiving device, the generated at least one signature being associated with a message identifier (ID) generated by the messaging server, the message ID being indicative of the electronic message to be transmitted to the at least one message receiving device;
   b) storing, by the messaging server, the generated at least one signature along with the generated message ID in a data storage;
   c) determining, by the messaging server, whether the electronic message is malicious;
   d) if the electronic message is determined to be malicious, determining, by the messaging server, on the basis of the at least one signature generated for the determined malicious message, whether electronic messages comparable to the determined malicious message were classified as non-malicious and transmitted to the at least one message receiving device in the past, wherein the determining step comprises comparing the at least one signature of the determined malicious message with signatures stored in the data storage which are associated with previously transmitted electronic messages; and
   e) identifying, on the basis of the stored signatures and associated IDs, those electronic messages that are found to have signatures comparable with the at least one signature of the determined malicious message and that were classified as non-malicious and transmitted to the at least one message receiving device in the past, and notifying, by the messaging server, the at least one message receiving device about a potential threat, wherein the notifying comprises providing information to the at least one message receiving device which indicates that a specific message transmitted in the past is malicious, wherein at least the steps (a) to (c) are repeated for each new message to be transmitted from the at least one message sending device to the at least one message receiving device.

9. A non-transitory computer-readable recording medium storing a computer program product comprising program code portions that, when executed on a computer device, cause the computing device to perform operations for detecting malicious electronic messages transmitted from at least one message sending device to at least one message receiving device, the operations comprising:
   a) generating, by the messaging server, at least one signature for a new electronic message to be transmitted from the at least one message sending device to the at least one message receiving device, the generated at least one signature being associated with a message identifier (ID) generated by the messaging server, the message ID being indicative of the electronic message to be transmitted to the at least one message receiving device;
   b) storing, by the messaging server, the generated at least one signature along with the generated message ID in a data storage;
   c) determining, by the messaging server, whether the electronic message is malicious;
   d) if the electronic message is determined to be malicious, determining, by the messaging server, on the basis of the at least one signature generated for the determined malicious message, whether electronic messages comparable to the determined malicious message were classified as non-malicious and transmitted to the at least one message receiving device in the past, wherein the determining step comprises comparing the at least one signature of the determined malicious message with signatures stored in the data storage which are associated with previously transmitted electronic messages; and
   e) identifying, on the basis of the stored signatures and associated IDs, those electronic messages that are found to have signatures comparable with the at least one signature of the determined malicious message and that were classified as non-malicious and transmitted to the at least one message receiving device in the past, and notifying, by the messaging server, the at least one message receiving device about a potential threat, wherein the notifying comprises providing information to the at least one message receiving device which indicates that a specific message transmitted in the past is malicious, wherein at least the steps (a) to (c) are repeated for each new message to be transmitted from the at least one message sending device to the at least one message receiving device.

10. A messaging server which is configured to transmit electronic messages received from at least one message sending device to at least one data receiving device, wherein the server is designed to:
   a) generate at least one signature for a new electronic message to be transmitted from the at least one message sending device to the at least one message receiving device, the generated at least one signature being associated with a message identifier (ID) generated by the messaging server, the message ID being indicative of the electronic message to be transmitted to the at least one message receiving device;
   b) store the generated at least one signature along with the generated message ID in a data storage;
   c) determine whether the electronic message is malicious or not;
   d) if the electronic message is determined to be malicious, determine whether electronic messages comparable to the determined malicious message were classified as non-malicious and transmitted to the at least one message receiving device in the past by comparing the at least one signature of the determined malicious message with signatures stored in the data storage which are associated with previously transmitted electronic messages; and
   e) identify, on the basis of the stored signatures and associated message IDs, those electronic messages that are found to have signatures comparable with the at least one signature of the determined malicious message and that were classified as non-malicious and transmitted to the at least one message receiving device in the past, and notify, the at least one message receiving device about a potential threat, wherein the notifying comprises providing information to the at least one message receiving device which indicates that a specific message transmitted in the past is malicious;
wherein at least the steps (a) to (c) are repeated for each new message to be transmitted from the at least one message sending device to the at least one message receiving device.

11. The method according to claim 3, wherein the specific message information comprises at least one of the following information:
transmission time of the message;
message sender information;
message destination information; and
information about message attachments.

* * * * *